(12) United States Patent
Reddy et al.

(10) Patent No.: US 6,858,566 B1
(45) Date of Patent: Feb. 22, 2005

(54) METHODS OF GENERATING GAS IN AND FOAMING WELL CEMENT COMPOSITIONS

(75) Inventors: B. Raghava Reddy, Duncan, OK (US); Karen Luke, Duncan, OK (US); Bryan K. Waugh, Comanche, OK (US); Roger S. Cromwell, Walters, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 280 days.

(21) Appl. No.: 10/159,001

(22) Filed: May 31, 2002

(51) Int. Cl.$^7$ ............................ C09K 3/00; E21B 33/13; C04B 16/08
(52) U.S. Cl. ..................... 507/202; 507/269; 507/239; 507/244; 507/247; 166/293; 166/309; 106/672; 106/673; 106/677; 106/678
(58) Field of Search ................... 507/202, 269, 507/244, 239, 247; 166/293, 309; 106/572, 672, 673, 677, 678

(56) References Cited

U.S. PATENT DOCUMENTS

| | | | |
|---|---|---|---|
| 3,591,394 A | 7/1971 | Diggelmann et al. ......... 106/87 |
| 3,958,638 A | 5/1976 | Johnston ..................... 166/294 |
| 3,977,470 A | 8/1976 | Chang ......................... 166/273 |
| 4,142,909 A | 3/1979 | Gaines ........................ 106/87 |
| 4,201,678 A | 5/1980 | Pye et al. ................ 252/8.5 A |
| 4,219,083 A | 8/1980 | Richardson et al. ........ 166/300 |
| 4,232,741 A | 11/1980 | Richardson et al. ........ 166/281 |
| 4,289,633 A | 9/1981 | Richardson et al. ... 252/8.55 B |
| 4,304,298 A | 12/1981 | Sutton ......................... 166/293 |
| 4,333,764 A | 6/1982 | Richardson ................... 106/87 |
| 4,340,427 A | 7/1982 | Sutton ......................... 106/87 |
| 4,367,093 A | 1/1983 | Burkhalter et al. ............ 106/87 |
| 4,450,010 A * | 5/1984 | Burkhalter et al. ......... 106/673 |
| 4,452,898 A | 6/1984 | Richardson ................... 436/2 |
| 4,565,578 A | 1/1986 | Sutton et al. ................. 106/87 |
| 4,692,269 A | 9/1987 | Kmiec et al. ................ 252/350 |
| 4,741,401 A | 5/1988 | Walles et al. ............... 166/300 |
| 4,813,484 A | 3/1989 | Hazlett ........................ 166/270 |
| 4,832,123 A | 5/1989 | Abou-Sayed et al. ....... 166/281 |
| 4,844,163 A | 7/1989 | Hazlett et al. .............. 166/270 |
| 4,848,465 A | 7/1989 | Hazlett ........................ 166/270 |
| 4,899,819 A | 2/1990 | Hazlett et al. .............. 166/285 |
| 5,236,526 A * | 8/1993 | Perotto ........................ 149/17 |
| 5,373,901 A | 12/1994 | Norman et al. ............. 166/300 |
| 5,413,178 A | 5/1995 | Walker et al. .............. 166/300 |
| 5,495,891 A | 3/1996 | Sydansk ..................... 166/295 |
| 5,613,558 A | 3/1997 | Dillenbeck, III ............ 166/293 |
| 5,658,380 A | 8/1997 | Dillenbeck, III ............ 106/823 |
| 5,669,446 A | 9/1997 | Walker et al. .............. 166/300 |
| 5,789,352 A | 8/1998 | Carpenter et al. .......... 507/209 |
| 5,950,731 A | 9/1999 | Shuchart et al. ............ 166/300 |
| 5,962,808 A | 10/1999 | Lundstrom ................. 149/19.1 |
| 5,972,103 A | 10/1999 | Mehta et al. ................ 106/728 |
| 5,996,693 A | 12/1999 | Heathman ................... 166/291 |
| 6,035,933 A | 3/2000 | Khalil et al. ................ 166/263 |
| 6,063,738 A | 5/2000 | Chatterji et al. ............. 507/269 |
| 6,138,760 A | 10/2000 | Lopez et al. ................ 166/300 |
| 6,162,839 A | 12/2000 | Klauck et al. ................ 521/83 |
| 6,187,720 B1 | 2/2001 | Acker et al. ................ 507/238 |
| 6,209,646 B1 | 4/2001 | Reddy et al. ................ 166/300 |
| 6,270,565 B1 | 8/2001 | Heathman ................... 106/696 |
| 6,364,945 B1 | 4/2002 | Chatterji et al. ............. 106/677 |
| 6,419,016 B1 | 7/2002 | Reddy ........................ 166/293 |
| 6,444,316 B1 | 9/2002 | Reddy et al. ................ 428/407 |
| 6,460,632 B1 | 10/2002 | Chatterji et al. .............. 175/66 |
| 6,592,660 B2 | 7/2003 | Nguyen et al. ............. 106/677 |
| 6,715,553 B2 * | 4/2004 | Reddy et al. ................ 166/309 |
| 6,722,434 B2 * | 4/2004 | Reddy et al. ................ 166/292 |
| 2002/0035951 A1 | 3/2002 | Chatterji et al. ............. 106/677 |

OTHER PUBLICATIONS

Paper entitled "Specification for Materials and Testing for Well Cement" by American Petroleum Institute, dated Jul. 2001.

\* cited by examiner

*Primary Examiner*—Philip C. Tucker
(74) *Attorney, Agent, or Firm*—Craig W. Roddy; Baker Botts L.L.P.

(57) ABSTRACT

The present invention relates to methods of generating gas in and forming cement compositions that may be introduced into a subterranean zone. A method of the present invention provides a method of generating gas in a cement composition that comprises providing the cement composition comprising a hydraulic cement and water; providing an oxidizing agent; providing at least one gas generating chemical; and contacting the cement composition with the oxidizing agent and/or the gas generating chemical downstream of at least one cement pump so that a gas is generated in the cement composition downstream of at least one cement pump. Methods of foaming cement compositions are also provided.

85 Claims, No Drawings

METHODS OF GENERATING GAS IN AND FOAMING WELL CEMENT COMPOSITIONS

BACKGROUND OF THE INVENTION

1. Field of the Invention

The present invention relates to methods of generating gas in and foaming well cement compositions during pumping of the compositions.

2. Description of the Prior Art

Foamed hydraulic cement compositions have heretofore been utilized in oil and gas well cementing applications. Typically, a hydraulic cement composition is foamed by combining a mixture of foaming and foam stabilizing surfactants with the cement composition on the surface followed by injecting gas, typically nitrogen, into the cement composition containing the surfactants as the cement composition is pumped into the well bore. This process allows the cement composition to have a gas concentration of from 1% to 99% by volume of the cement composition depending on the downhole pressure and temperature and the amount of gas injected into the cement composition at the surface. However, the equipment required for storing the nitrogen in liquid or gaseous form and injecting it into a cement composition is very elaborate and expensive. In addition, the equipment is frequently unavailable or can not be easily transported to well sites due to their remote locations.

In-situ gas forming agents have been utilized heretofore in well cement compositions to prevent annular gas migration. For example, surfactant coated finely ground aluminum has been included in cement compositions to generate hydrogen gas in the compositions as they are being pumped down well bores and after they are placed in annuluses between the walls of the well bores and casing or other pipe strings therein. The presence of the gas in the cement compositions prevents formation fluids from entering the cement compositions as the cement compositions develop gel strength. That is, the development of gel strength reduces the ability of a cement composition column to transmit hydrostatic pressure. If the hydrostatic pressure of the cement composition column falls below the formation pore pressure before the cement composition has gained sufficient strength to prevent the entry of formation fluids into the well bore, the fluids enter the well bore and form channels in the cement composition column which remain after the cement composition column sets. The presence of the gas which is generated in the cement composition from the finely ground aluminum increases the volume of the cement composition such that the volume increase generated by the gas equals or slightly exceeds the cement composition volume reduction during the development of gel strength due to fluid loss and/or the cement hydration reaction. The increase in volume in the compressibility produced in the cement composition by the gas allows the cement composition column to resist the entry of formation fluids into the well bore.

Other gas forming agents have also been added to well cement compositions to gasify the compositions. For example, U.S. Pat. No. 4,450,010 issued on May 22, 1984 to Burkhalter et al. discloses a well cementing method and gasified cements useful in carrying out the method. That is, U.S. Pat. No. 4,450,010 discloses a method of cementing in subterranean formations using a gasified cement composition which prevents formation fluids from entering the cement composition column formed in the annulus between the well bore and a pipe string therein. The cement composition includes a nitrogen gas generating material, an oxidizing agent and a reaction rate control material whereby a quantity of gas is generated in the cement composition to offset the shrinkage in the cement composition column as it develops gel strength and to provide compressibility thereto whereby the entry of formation fluids into the well bore is reduced or prevented.

While the methods and cement compositions of the prior art have achieved varying degrees of commercial success, a problem which ofen occurs in the use of the methods and cement compositions is that gas is produced in the cement composition prior to and during the pumping of the cement compositions into the well bore which causes gas-locking of the cement pumps. When such gas-locking occurs, the pumps must be shut down and the gas removed during which time additional gas is formed in the cement compositions which causes additional gas-locking when the pumps are again started.

SUMMARY OF THE INVENTION

The present invention relates to methods of generating gas in and foaming well cement compositions. In one embodiment, the present invention provides a method of generating gas in a cement composition that comprises providing the cement composition comprising a hydraulic cement, water, and an oxidizing agent; providing an aqueous solution or dispersion that comprises at least one gas generating chemical; and contacting the cement composition downstream of at least one cement pump with the aqueous solution or dispersion so that a gas is generated in the cement composition downstream of at least one cement pump. In another embodiment, the present invention provides a method of generating gas in a cement composition that comprises providing the cement composition comprising a hydraulic cement, water, and at least one gas generating chemical; providing an aqueous solution or dispersion that comprises an oxidizing agent; and contacting the cement composition downstream of at least one cement pump with the aqueous solution or dispersion so that a gas is generated in the cement composition downstream of at least one cement pump.

In another embodiment, the present invention provides a method of generating a gas in a cement composition that comprises providing the cement composition comprising a hydraulic cement and water; providing an oxidizing agent; contacting the cement composition with the oxidizing agent; contacting the cement composition downstream of at least one cement pump with at least one gas generating chemical; and allowing the gas generating chemical to react so as to generate gas in the cement composition. In another embodiment, the present invention provides a method of cementing a subterranean zone that comprises providing the cement composition that comprises a hydraulic cement and water; contacting the cement composition downstream of at least one cement pump with an oxidizing agent and at least one gas generating chemical; allowing gas to generate in the cement composition; and allowing the cement to set in the subterranean zone.

In another embodiment, the present invention provides a method of cementing a subterranean zone that comprises providing a cement composition comprising a hydraulic cement, water, and an oxidizing agent; contacting the cement composition downstream of at least one cement pump with an aqueous solution or dispersion that comprises water and at least one gas generating chemical; allowing gas to be generated in the cement composition to form a foamed cement composition; and allowing the foamed cement composition to set in the subterranean zone. In another embodiment, the present invention provides a method of foaming a cement composition that comprises placing the cement composition comprising a hydraulic cement and water; contacting the cement composition with an aqueous solution or dispersion that comprises at least one gas generating chemical; contacting the cement composition with an oxidizing agent downstream of at least one cement pump; and allowing the gas generating chemical to react so as to generate a gas in the cement composition to foam the cement composition in the subterranean zone to form a foamed cement composition. In another embodiment, the present invention provides a method of reducing gas-locking problems when cementing a subterranean zone that comprises providing a cement composition that comprises a hydraulic cement, water, and an oxidizing agent; contacting the cement composition downstream of at least one cement pump with an aqueous solution or dispersion that comprises water and a gas generating chemical; allowing the gas generating chemical to react so as to produce gas in the cement composition to produce a foamed cement composition; and allowing the foamed cement composition to set in the subterranean zone.

Thus, in accordance with the methods of the present invention, gas is generated in the cement composition after the cement composition passes through the cement pumps whereby the cement pumps are not gas-locked.

The objects, features and advantages of the present invention will be readily apparent to those skilled in the art upon a reading of the description of preferred embodiments which follows.

DESCRIPTION OF PREFERRED EMBODIMENTS

The present invention provides improved methods of generating gas in and foaming well cement compositions while the cement compositions are being pumped. The methods prevent gas from being generated in a cement composition until after the cement composition has been pumped by one or more cement pumps thereby preventing gas-locking of the pumps. In accordance with a method of the invention, a well cement composition is provided comprised of a hydraulic cement, sufficient water to form a pumpable slurry and a water soluble oxidizing agent. The cement composition is pumped into a subterranean zone by way of the well bore penetrating the subterranean zone with one or more cement pumps. An aqueous solution or dispersion comprised of water, a gas generating chemical which is activated to produce gas by an oxidizing agent and a water soluble mixture of foaming and foam stabilizing surfactants is provided. The aqueous solution or dispersion containing the gas generating chemical and the mixture of surfactants is pumped or otherwise introduced into the cement composition containing the oxidizing agent on the surface at a point downstream of the one or more cement pumps. The oxidizing agent activates the gas generating chemical whereby gas is produced in the cement composition and the cement composition is foamed and stabilized by the mixture of surfactants as the cement composition flows into and through the well bore. Thus, by using the above described method of this invention, gas is not generated in the cement composition until after the cement composition is pumped thereby preventing the cement pump or pumps from being gas-locked.

A variety of hydraulic cements can be utilized in the cement compositions including those comprised of calcium, aluminum, silicon, oxygen and/or sulfur which set and harden by reaction with water. Such hydraulic cements include Portland cements, pozzolana cements, gypsum cements, aluminous cements and silica cements. Portland cements or their equivalents are generally preferred for use in accordance with the present invention. Portland cements of the types defined and described in the *API Specification For Materials And Testing For Well Cements*, API Specification 10, 5th Edition, dated Jul. 1, 1990 of the American Petroleum Institute are particularly suitable. Preferred API Portland cements include classes A, B, C, G and H with API classes G and H being the most preferred.

The water utilized in the cement compositions can be fresh water or salt water. The term "salt water" is used herein to mean unsaturated aqueous salt solutions and saturated aqueous salt solutions including brine and seawater. The water is generally present in the cement compositions in an amount sufficient to form a slurry, i.e., an amount in the range of from about 30% to about 100% by weight of hydraulic cement in the compositions, more preferably in an amount in the range of from about 35% to about 60%.

The gas generating chemicals useful in accordance with this invention primarily generate nitrogen along with small amounts of ammonia depending on the chemical structure of the gas generating chemical and the oxidizing agent. When the gas generating chemical molecule contains amide groups, additional ammonia, carbon dioxide and carbon monoxide may be produced. The gas generating chemicals are generally solid materials that liberate gas or gases on their own when they are heated to a temperature in the range of from about 200° F. to about 500° F. without requiring an activating oxidizing agent.

Examples of water soluble oxidizing agents that can be used in the well cement compositions of this invention include, but are not limited to, ammonium persulfate, sodium persulfate, potassium persulfate, sodium chlorite, sodium perborate, sodium peroxy carbonate, calcium hypochlorite, sodium hypochlorite, sodium hypobromite, sodium bromite, sodium bromate and sodium chlorate. Of these, sodium chlorite is preferred. The oxidizing agent is generally included in the well cement composition in an amount in the range of from about 2% to about 20% by weight of hydraulic cement in the composition.

As mentioned, the aqueous solution or dispersion combined with the well cement composition downstream of the well cement pump or pumps is comprised of water, a gas generating chemical which is activated by the oxidizing agent in the well cement composition to produce gas and a water soluble mixture of foaming and foam stabilizing surfactants.

The water in the aqueous solution or dispersion can be fresh water or salt water as described above. The gas generating chemicals which can be used in the aqueous solution or dispersion include, but are not limited to, hydrazine and its salts with acids, azodicarbonamide, azobis (isobutyronitrile), p-toluene sulfonyl hydrazide, p-toluene sulfonyl semicarbazide, carbohydrazide, p-p'-oxybis (benzenesulfonylhydrazide) and mixtures thereof. Of these, carbohydrazide is preferred. The gas generating chemical or chemicals are generally present in the aqueous solution or dispersion in an amount in the range of from about 0% to about 50% by weight of water in the aqueous solution or dispersion, more preferably in an amount of from about 0% to about 40%.

The water soluble mixture of foaming and foam stabilizing surfactants in the aqueous solution or dispersion functions to facilitate foaming of the cement composition and to stabilize the foam after it is formed. An example of such a mixture of foaming and foam stabilizing surfactants which is preferred for use in accordance with this invention is comprised of an ethoxylated alcohol ether sulfate surfactant, an alkyl or alkene amidopropylbetaine surfactant and an alkyl or alkene amidopropyldimethylamine oxide surfactant. A preferred such mixture is comprised of 63.3 parts by weight of the ethoxylated alcohol ether sulfate surfactant, 31.7 parts by weight of the alkyl or alkene amidopropylbetaine surfactant and 5 parts by weight of the alkyl or alkene amidopropyldimethylamine oxide surfactant. The mixture of surfactants is described in detail in U.S. Pat. No. 6,063,738 issued on May 16, 2000 to Chatterji et al. which is incorporated herein by reference thereto. The mixture of surfactants is generally included in the aqueous solution or dispersion in an amount in the range of from about 2% to about 15% by weight of water therein, more preferably in an amount of about 4% to about 10%.

In carrying out the above described method, the well cement composition and the aqueous solution or dispersion are pumped at rates such that the weight ratio of the oxidizing agent in the well cement composition to the gas generating chemical in the aqueous solution or dispersion is in the range of from about 15:1 to about 1:1.

The aqueous solution or dispersion described above can also include hydraulic cement. That is, the aqueous solution or dispersion can be a second cement composition which is pumped into the first cement composition downstream of the cement pumps. When a hydraulic cement is included in the aqueous solution or dispersion it is a hydraulic cement of the various types described above, preferably Portland cement. The hydraulic cement is included in the aqueous solution or dispersion in an amount in the range of from about 150% to about 300% by weight of water in the aqueous solution or dispersion.

Another method of the present invention for generating gas in and foaming a cement composition introduced into a subterranean zone penetrated by a well bore without incurring gas-locking problems with the cement pump or pumps is as follows. A well cement composition comprised of a hydraulic cement, sufficient water to form a pumpable slurry and a gas generating chemical which is activated to produce gas by an oxidizing agent is provided. The cement composition is pumped into the subterranean zone by way of the well bore with one or more cement pumps. An aqueous solution or dispersion comprised of water, a gas generating chemical which is activated to produce gas when introduced into a well cement composition but is not activated to produce gas by an oxidizing agent, a water soluble mixture of foaming and foam stabilizing surfactants and an oxidizing agent is also provided. The aqueous solution or dispersion containing the gas generating chemical activated by a cement composition, the mixture of surfactants and the oxidizing agent is pumped or otherwise introduced into the cement composition downstream of the one or more cement pumps. Upon the mixing of the well cement composition and the aqueous solution or dispersion, the gas generating chemical in the cement composition is activated by the oxidizing agent in the aqueous solution or dispersion to produce gas and the gas generating chemical in the aqueous solution or dispersion is activated by the cement composition to produced gas. The cement composition is foamed with the gas and stabilized by the mixture of surfactants in the aqueous solution, or dispersion, all as the resulting cement composition flows through the well bore and into the subterranean zone.

The hydraulic cement utilized in the well cement composition can be any of the various hydraulic cements described above and is preferably Portland cement. The water utilized in the cement composition and the aqueous solution or dispersion is selected from the group consisting of fresh water or salt water. The water is generally present in the cement composition in an amount in the range of from about 30% to about 70% by weight of the hydraulic cement therein.

The gas generating chemical in the well cement composition which is activated to produce gas by an oxidizing agent includes, but is not limited to, toluene sulfonyl hydrazide, carbohydrazide, toluene sulfonyl semicarbazide, hydrazine and its salts with acids, and mixtures thereof. Of these, carbohydrazide is preferred. The gas generating chemical which is activated by an oxidizing agent is present in the well cement composition in an amount in the range of from about 2% to about 15% by weight of hydraulic cement in the composition.

The water in the aqueous solution or dispersion can be fresh water or salt water as described above. The gas generating chemical in the aqueous solution or dispersion which is activated when introduced into a well cement composition is selected from the group consisting of azodicarbonamide, azobis(isobutyronitrile) and azodicarboxylic acid and its salts of alkali and alkaline earth metals and mixtures thereof. Of these, azodicarbonamide is preferred. The gas generating chemical which is activated when introduced into a well cement composition is present in the aqueous solution or dispersion in an amount in the range of from about 0% to about 50% by weight of water in the aqueous solution or dispersion.

The water soluble mixture of foaming and foam stabilizing surfactants is comprised of a mixture of an ethoxylated alcohol ether sulfate surfactant, an alkyl or alkene amidopropylbetaine surfactant and an alkyl or alkene amidopropyldimethylamine oxide as described above. The mixture of surfactants is present in the aqueous solution or dispersion in an amount in the range of from about 2% to about 15% by weight of water in the aqueous solution.

In carrying out the above method, the well cement composition and the aqueous solution or dispersion are pumped at rates such that the weight ratio of the gas generating chemical in the well cement composition to the oxidizing agent in the aqueous solution or dispersion is in the range of from about 1:1 to about 1:15.

When the aqueous solution or dispersion is mixed with the well cement composition downstream of the cement pumps, the gas generating chemical in the well cement composition is activated to produce gas by the oxidizing agent in the aqueous solution or dispersion and the gas generating chemical in the aqueous solution or dispersion is activated to produce gas by the well cement composition. The combined cement composition is foamed with the produced gas as it travels through the well bore into the subterranean zone and the foam is facilitated and stabilized by the mixture of surfactants.

Yet another method of this invention for generating gas in and foaming a cement composition introduced into a subterranean zone penetrated by a well bore is as follows. A well cement composition is provided comprised of a hydraulic cement, sufficient water to form a pumpable slurry and a gas generating chemical which is activated to produce gas by an oxidizing agent. The cement composition is pumped into the subterranean zone by way of the well bore with one or more cement pumps. An aqueous solution or dispersion is provided comprised of water, a gas generating chemical which is activated to produce gas when introduced into a well cement composition but is not activated to produce gas by an oxidizing agent and an oxidizing agent. The aqueous solution or dispersion containing the gas generating chemical activated by a cement composition and the oxidizing agent are pumped or otherwise introduced into the cement composition containing the gas generating chemical which is activated by an oxidizing agent downstream of the one or more cement pumps so that the well cement composition and the aqueous solution or dispersion are combined and gas is produced in the cement composition. An aqueous solution of a mixture of foaming and foam stabilizing surfactants is also provided. The aqueous solution of the mixture of surfactants is pumped or otherwise introduced into the combined cement composition so that the final composition formed is foamed and stabilized by the mixture of surfactants as the cement composition flows through the well bore.

The hydraulic cement, the water and the gas generating chemical utilized in the above described method are the same and present in the same amounts as those set forth above for the preceding method. The water, the gas generating chemical which is activated to produce gas when introduced into a well cement composition but is not activated to produce gas by an oxidizing agent are also as described above and are present in the amounts given above.

The aqueous solution of a mixture of foaming and foam stabilizing surfactants includes the mixture of surfactants described above present in the solution in an amount in the range of from about 25% to about 50% by weight of the water in the solution. Finally, the well cement composition, the aqueous solution or dispersion and the aqueous solution of foaming and foam stabilizing surfactants are pumped at rates such that the weight ratio of the gas generating chemical in the well cement composition to the oxidizing agent in the aqueous solution or dispersion to the mixture of surfactants in the aqueous solution thereof is in the range of from about 1:1:0.1 to about 1:15:0.6.

As is well understood by those skilled in the art, the cement compositions of this invention can include a variety of additives for improving or changing the properties of the cement compositions. Examples of such additives include, but are not limited to, set retarding agents, fluid loss control agents, dispersing agents, set accelerating agents and formation conditioning agents.

A preferred method of this invention for generating gas in and foaming a cement composition introduced into a subterranean zone penetrated by a well bore comprises the steps of: (a) providing a well cement composition comprised of a hydraulic cement, sufficient water to form a pumpable slurry and a water soluble oxidizing agent; (b) pumping the cement composition into the subterranean zone by way of the well bore with one or more cement pumps; (c) providing an aqueous solution or dispersion comprised of water, a gas generating chemical which is activated to produce gas by an oxidizing agent and a water soluble mixture of foaming and foam stabilizing surfactants; and (d) pumping the aqueous solution or dispersion containing the gas generating chemical and the mixture of surfactants or otherwise introducing it into the cement composition containing the oxidizing agent downstream of the one or more cement pumps so that the well cement composition and said aqueous solution or dispersion are combined, the oxidizing agent activates the gas generating chemical whereby gas is produced in the cement composition and the combined cement composition is foamed with the gas and stabilized by the mixture of surfactants as the combined cement composition flows into and through the well bore.

Another method of this invention for generating gas in and foaming a cement composition introduced into a subterranean zone penetrated by a well bore comprises the steps of: (a) providing a well cement composition comprised of a hydraulic cement, sufficient water to form a pumpable slurry and an oxidizing agent selected from the group consisting of ammonium persulfate, sodium persulfate, potassium persulfate, sodium chloride, sodium chlorate, hydrogen peroxide, sodium perborate, sodium peroxy carbonate, calcium hypochlorite, sodium hypochlorite, sodium hypobromite, sodium bromite, sodium bromate, sodium chlorate and mixtures thereof; (b) pumping the well cement composition into the subterranean zone by way of the well bore with one or more cement pumps; (c) providing an aqueous solution or dispersion comprised of water, a gas generating chemical which is activated to produce gas by an oxidizing agent and a water soluble mixture of foaming and foam stabilizing surfactants, the gas generating chemical being selected from the group consisting of hydrazine and its salts with acids, azodicarbonamide, azobis(isobutyronitrile), p-toluene sulfonyl hydrazide, p-toluene sulfonyl semicarbazide, carbohydrazide, p-p'-oxybis (benzenesulfonylhydrazide) and mixtures thereof; and (d) pumping the aqueous solution or dispersion containing the gas generating chemical and the mixture of surfactants or otherwise introducing it into the cement composition containing the oxidizing agent downstream of the one or more cement pumps so that the oxidizing agent activates the gas generating chemical whereby gas is produced in the cement composition, and the cement composition is foamed with the gas and stabilized by the mixture of surfactants as the cement composition flows into and through the well bore.

Still another method of generating gas in and foaming a cement composition introduced into a subterranean zone penetrated by a well bore comprises the steps of: (a) providing a well cement composition comprised of a hydraulic cement, sufficient water to form a pumpable slurry and a gas generating chemical which is activated to produce gas by an oxidizing agent; (b) pumping the well cement composition into the subterranean zone by way of the well bore with one or more cement pumps; (c) providing an aqueous solution or dispersion comprised of water, a gas generating chemical which is activated to produce gas when introduced into a well cement composition but is not activated to produce gas by an oxidizing agent, a water soluble mixture of foaming and foam stabilizing surfactants and an oxidizing agent; and (d) pumping the aqueous solution or dispersion containing the gas generating chemical activated by a cement composition, the mixture of foaming and foam stabilizing surfactants and the oxidizing agent or otherwise introducing it into the cement composition containing the gas generating chemical which is activated by an oxidizing agent downstream of the one or more cement pumps so that the well cement composition and the aqueous solution or dispersion are combined, gas is produced in the cement composition and the combined cement composition is foamed with the gas and stabilized by the mixture of surfactants as the cement composition flows through the well bore.

Yet another method of generating gas in and foaming a cement composition introduced into a subterranean zone penetrated by a well bore comprises the steps of: (a) providing a well cement composition comprised of a hydraulic cement, sufficient water to form a pumpable slurry and a gas generating chemical which is activated to produce gas by an oxidizing agent; (b) pumping the well cement composition into the subterranean zone by way of the well bore with one or more cement pumps; (c) providing an aqueous solution or dispersion comprised of water, a gas generating chemical which is activated to produce gas when introduced into a well cement composition but is not activated to produce gas by an oxidizing agent and an oxidizing agent; (d) pumping the aqueous solution or dispersion containing the gas generating chemical activated by a cement composition and the oxidizing agent or otherwise introducing it into the cement composition containing the gas generating chemical which is activated by an oxidizing agent downstream of the one or more cement pumps so that the well cement composition and the aqueous solution or dispersion are combined and gas is produced in the cement composition; (e) providing an aqueous solution of a mixture of foaming and foam stabilizing surfactants; and (f) pumping the aqueous solution of a mixture of foaming and foam stabilizing surfactants or otherwise introducing it into the combined cement composition so that the final cement composition formed is foamed with the gas and stabilized by the mixture of surfactants as the cement composition flows through the well bore.

In order to further illustrate the methods of the present invention, the following examples are given.

EXAMPLE 1

In a recirculating cement mixer, a dry blend of 3,000 pounds of Class A cement with 150 pounds of toluenesulfonyl hydrazide was mixed with water to prepare a slurry of density of 16.3 pounds per gallon. The slurry was held in the mixing equipment for 5 minutes. Just before pumping the slurry through a high pressure pump, 5 gallons of the foaming and foam stabilizing surfactant mixture was injected with minimal agitation. In a separate tank provided with paddle agitation, 138 pounds of potassium persulfate was dissolved in 36 gallons of water. To this solution, 30 pounds of azodicarbonamide was added with stirring to obtain an aqueous dispersion. The two fluids were combined by pumping both fluids into a pressurized flow loop. The two fluids flowed through a 1" choke to assure mixing of the fluids. The fluid loop had a constant pressure of 500 psi through the pumping process. The fluid loop included a 10 ft. inline sample chamber having valves at opposite ends. All fluid flow was maintained through the sample chamber. Just prior to ending the pumping of the fluid mixture, the valves were closed trapping the foamed cement in the 10 ft.×2 in. (diameter) pipe. The sample pressure was 500 psi as with the flow loop pressure. The sample chamber was then removed and the cement slurry was allowed to set. Considerable amount of heat was generated during the gas generation process. After 3 days of curing at room temperature, the sample chamber was cut open cautiously while releasing the pressure slowly. Density measurements were made on the set cement. The density values of set cement obtained from different segments of the pipe indicated that the percent nitrogen in the sample was in the 15–20% range by volume.

EXAMPLE 2

For laboratory evaluation of the gas generating compositions under pressure to simulate downhole pressures, a specialized apparatus was built, the description of which is as follows. A metal pipe, made of 17-4 stainless steel and pressure rated for 30,000 psi, with an outer diameter of 3.5" and an inner diameter of 2.44" and provided with Acme threads at the top and at about 2" from the bottom end was drilled to provide four entry points at equal distances from each other. One hole was fitted with a thermocouple, the second and third holes were fitted to serve as ports for pumping or withdrawing fluids, and the fourth hole was provided with a plug. The bottom end of the chamber was fitted with a scaled stirring mechanism connected to a paddle on the inside and an electric motor on the outside. The height of the paddle was such that the injected fluids entered at about the middle of the paddle. The chamber was provided with a tightly fitting piston provided with an O-ring and a rod. The top of the chamber was fitted with a lid assembly with a hole in the center through which the rod attached to the piston could move up and down. The lid assembly was provided with an inlet for connection to a water supply line that had an inline Sprague™ pump. A fluid pump manufactured by Ruska Instrument Corporation, Houston, Tex. was used to pump fluid into the chamber. The equipment was calibrated to read volume increase by measuring the length of the rod extending through the top lid assembly.

A cement slurry was prepared by mixing 350 grams Class A cement and 27 grams of sodium chlorite (79% active content) with 146 grams water. About 250 cubic centimeters of this slurry were introduced into the chamber through one of the injection ports. The apparatus was pre-assembled such that the space below the piston becomes liquid-full with 250 cubic centimeters of an aqueous fluid. A 26.3 milliliter portion of an aqueous solution containing carbohydrazide (18.75% by weight) and foaming and foam stabilizing surfactants (5% by weight) was injected by means of the fluid injection pump. The density of the slurry with all the components added was 15.6 pounds per gallon. A pressure of 1,000 psi was exerted on top of the piston with pressurized water using the Sprague™ pump. The slurry was stirred at 2,000 rpm for 5 minutes. Any pressure increase due to gas generation was released such that a constant pressure of 1,000 psi on top of the cement slurry was maintained. The temperature increased to about 170° F. due to chemical reactions in the slurry. The extension of the rod attached to piston was measured and the expansion of the slurry volume due to gas generation was measured from the calibration curve. The slurry was collected in a collection chamber under a pressure of 950 psi and was allowed to set at that pressure at room temperature. The measured density of the set cement was 13.8 pounds per gallon. The % nitrogen gas present in set cement collected and cured at 1,000 psi was calculated to be about 11% by volume.

EXAMPLE 3

Using the experimental set up described in Example 2, the following experiment was performed. The preassembled chamber was charged with 288 cubic centimeters of a cement slurry prepared by mixing 800 grams of Class A cement, 8 grams sulfonated acetone formaldehyde condensate, and 52 grams carbohydrazide. After half of the slurry was added to the chamber, 2.3 grams of the foaming and foam stabilizing surfactant solution was injected and then the remaining slurry was added. The addition bole was closed with a plug, and 141 grams of sodium chlorite solution (37% active) was injected through a port in the chamber. The chamber was pressurized 750 psi and stirred at about 2,500 rpm for 5 minutes. The reaction was completed within this period as indicated by the rod extension. Based on the volume increase the amount of gas generated was calculated to be 47% by volume at 750 psi. The foamed slurry was collected into a collection vessel pressurized to 740 psi and collection vessel was kept overnight in a water bath maintained at 160° F. The set cement had a density of 10.5 pounds per gallon indicating the presence of gas phase at 33% by volume.

Thus, the present invention is well adapted to carry out the objects and ends and advantages mentioned as well as those which are inherent therein. While numerous changes can be made by those skilled in the art, such changes are encompassed within the spirit of this invention as defined by the appended claims.

What is claimed is:

1. A method of generating gas in a cement composition comprising the steps of:
   providing the cement composition comprising a hydraulic cement, water, and an oxidizing agent;
   providing an aqueous solution or dispersion that comprises at least one gas generating chemical; and
   contacting the cement composition downstream of at least one cement pump with the aqueous solution or dispersion so that a gas is generated in the cement composition.

2. The method of claim 1 wherein the weight ratio of the oxidizing agent to the gas generating chemical is in the range of from about 15:1 to about 1:1.

3. The method of claim 1 wherein the hydraulic cement comprises a Portland cement, a pozzalana cement, a gypsum cement, an aluminous cement, a silica cement, and/or a slag cement.

4. The method of claim 1 wherein the hydraulic cement is a Portland cement.

5. The method of claim 1 wherein the water in the cement composition comprises fresh water or salt water.

6. The method of claim 1 wherein the water is present in the cement composition in an amount in the range of from about 30% to about 70% by weight of the hydraulic cement in the cement composition.

7. The method of claim 1 wherein the oxidizing agent in the cement composition comprises ammonium persulfate, sodium persulfate, potassium persulfate, sodium chlorite, sodium chlorate, hydrogen peroxide, sodium perborate, sodium peroxy carbonate, calcium hypochlorite, sodium hypochlorite, sodium hypobromite, sodium bromite, sodium bromate, sodium chlorate, and/or a mixture thereof.

8. The method of claim 1 wherein the oxidizing agent in the cement composition comprises sodium chlorite.

9. The method of claim 1 wherein the oxidizing agent is present in the cement composition in an amount in the range of from about 5% to about 25% by weight of the hydraulic cement in the cement composition.

10. The method of claim 1 wherein the aqueous solution or dispersion comprises a water component that comprises fresh water or salt water.

11. The method of claim 1 wherein the gas generating chemical in the aqueous solution or dispersion comprises a hydrazine group, a hydrazine salt, azodicarbonamide, azobis(isobutyronitrile), p-toluene sulfonyl hydrazide, p-toluene sulfonyl semicarbazide, carbohydrazide, p-p'-oxybis(benzenesulfonylhydrazide), and/or a mixture thereof.

12. The method of claim 1 wherein the gas generating chemical in the aqueous solution or dispersion comprises carbohydrazide.

13. The method of claim 1 wherein the gas generating chemical is present in the aqueous solution or dispersion in an amount in the range of from about 10% to about 50% by weight of a water component in the aqueous solution or dispersion.

14. The method of claim 1 wherein the aqueous solution or dispersion further comprises a surfactant.

15. The method of claim 14 wherein the surfactant is present in the aqueous solution or dispersion in an amount in the range of from about 2% to about 15% by weight of a water component in the aqueous solution or dispersion.

16. A method of generating a gas in a cement composition comprising the steps of:
   providing the cement composition comprising a hydraulic cement and water;
   providing an oxidizing agent;
   contacting the cement composition with the oxidizing agent;
   contacting the cement composition downstream of at least one cement pump with at least one gas generating chemical;
   allowing the gas generating chemical to react so as to generate gas in the cement composition; and
   placing the cement composition into a subterranean zone.

17. The method of claim 16 wherein the oxidizing agent is provided as a component of the cement composition or in an aqueous solution or dispersion comprising the gas generating chemical.

18. The method of claim 17 wherein the aqueous solution or dispersion further comprises a surfactant.

19. The method of claim 18 wherein the surfactant comprises a mixture of a foaming and a foam stabilizing surfactant.

20. The method of claim 19 wherein the mixture comprises an ethoxylated alcohol ether sulfate surfactant, an alkyl amidopropyl betaine surfactant, an alkyl amidopropyl betaine surfactant, an alkyl amidopropyl dimethylamine oxide surfactant, or an alkene amidopropyl dimethylamine oxide surfactant.

21. The method of claim 17 wherein the aqueous solution or dispersion further comprises a hydraulic cement.

22. The method of claim 16 wherein the weight ratio of the oxidizing agent to the gas generating chemical is in the range of from about 15:1 to about 1:1.

23. The method of claim 16 wherein the hydraulic cement comprises a Portland cement, a pozzalana cement, a gypsum cement, an aluminous cement, a silica cement, and/or a slag cement.

24. The method of claim 16 wherein the water in the cement composition comprises fresh water or salt water.

25. The method of claim 16 wherein the water is present in the cement composition in an amount in the range of from about 30% to about 70% by weight of the hydraulic cement in the cement composition.

26. The method of claim 16 wherein the oxidizing agent in the cement composition comprises ammonium persulfate, sodium persulfate, potassium persulfate, sodium chlorite, sodium chlorate, hydrogen peroxide, sodium perborate, sodium peroxy carbonate, calcium hypochlorite, sodium hypochlorite, sodium hypobromite, sodium bromite, sodium bromate, sodium chlorate, and/or a mixture thereof.

27. The method of claim 16 wherein the gas generating chemical comprises a hydrazine group, a hydrazine salt, azodicarbonamide, azobis(isobutyronitrile), p-toluene sulfonyl hydrazide, p-toluene sulfonyl semicarbazide, carbohydrazide, p-p'-oxybis(benzenesulfonylhydrazide), and/or a mixture thereof.

28. A method of cementing a subterranean zone comprising the steps of:
   providing the cement composition that comprises a hydraulic cement and water;
   contacting the cement composition downstream of at least one cement pump with an oxidizing agent and at least one gas generating chemical;
   allowing gas to generate in the cement composition;
   placing the cement composition in the subterranean zone; and
   allowing the cement to set in the subterranean zone.

29. The method of claim 28 wherein the oxidizing agent or the gas generating chemical is provided as a component of the cement composition or in an aqueous solution or dispersion.

30. The method of claim 29 wherein the aqueous solution or dispersion further comprises a surfactant.

31. The method of claim 30 wherein the surfactant comprises a mixture of a foaming and a foam stabilizing surfactant.

32. The method of claim 31 wherein the mixture comprises an ethoxylated alcohol ether sulfate surfactant, an alkyl amidopropyl betaine surfactant, an alkene amidopropyl betaine surfactant, an alkyl amidopropyl dimethylamine oxide surfactant, or an alkene amidopropyl dimethylamine oxide surfactant.

33. The method of claim 29 wherein the aqueous solution or dispersion further comprises a hydraulic cement.

34. The method of claim 28 wherein the weight ratio of the oxidizing agent to the gas generating chemical is in the range of from about 15:1 to about 1:1.

35. The method of claim 28 wherein the subterranean zone is located in an annulus in a well bore.

36. The method of claim 28 wherein the cement composition comprises a second oxidizing agent.

37. The method of claim 28 wherein the cement composition comprises a Portland cement.

38. The method of claim 28 wherein the water is present in the cement composition in an amount in the range of from about 30% to about 70% by weight of the hydraulic cement in the cement composition.

39. The method of claim 28 wherein the gas generating chemical comprises toluene sulfonyl hydrazide, carbohydrazide, hydrazine, a hydrazine salt, azodicarbonamide, azobis(isobutyronitrile), azodicarboxylic acid, an azodicarboxylic salt of an alkali earth metal, an azodicarboxylic salt of an alkaline earth metal, or a mixture thereof.

40. The method of claim 28 wherein the gas generating chemical is present in an amount in the range of from about 2% to about 15% by weight of the hydraulic cement in the cement composition.

41. The method of claim 28 wherein the oxidizing agent is present in an amount in the range of from about 5% to about 25% by weight of the hydraulic cement in the cement composition.

42. A method of cementing a subterranean zone comprising the steps of:
providing a cement composition comprising a hydraulic cement, water, and an oxidizing agent;
contacting the cement composition downstream of at least one cement pump with an aqueous solution or dispersion that comprises water and at least one gas generating chemical;
allowing gas to be generated in the cement composition to form a foamed cement composition;
placing the foamed cement composition in the subterranean zone; and
allowing the foamed cement composition to set in the subterranean zone.

43. The method of claim 42 further comprising the step of contacting the foamed cement composition with a surfactant before allowing the foamed cement composition to set in the subterranean zone to at least partially stabilize the foamed cement composition to produce an at least partially stabilized foamed cement composition.

44. The method of claim 43 wherein the ratio of the gas generating chemical to the oxidizing agent to the surfactant in the at least partially stabilized foamed cement composition is in the range of from about 1:1:0.1 to about 1:15:0.6.

45. The method of claim 43 wherein the surfactant comprises an ethoxylated alcohol ether sulfate surfactant, an alkyl amidopropyl betaine surfactant, an alkene amidopropyl betaine surfactant, an alkyl amidopropyl dimethylamine oxide, or an alkene amidopropyl dimethylamine oxide.

46. The method of claim 42 wherein the hydraulic cement in the cement composition comprises a Portland cement, a pozzalana cement, a gypsum cement, an aluminous cement, a silica cement, or a slag cement.

47. The method of claim 42 wherein the water in the cement composition comprises fresh water or sea water.

48. The method of claim 42 wherein the gas generating chemical comprises toluene sulfonyl hydrazide, carbohydrazide, hydrazine, a hydrazine salt, an azodicarbonamide, azodicarboxylic acid, an azodicarboxylic salt of an alkali earth metal, an azodicarboxylic salt of an alkaline earth metal, or a mixture thereof.

49. The method of claim 42 wherein the gas generating chemical is present in an amount in the range of from about 2% to about 15% by weight of the hydraulic cement in the cement composition.

50. A method of foaming a cement composition
providing the cement composition comprising a hydraulic cement and water;
contacting the cement composition with an aqueous solution or dispersion that comprises at least one gas generating chemical;
contacting the cement composition with an oxidizing agent downstream of at least one cement pump;
placing the cement composition in the subterranean zone; and
allowing the gas generating chemical to react so as to generate a gas in the cement composition to foam the cement composition in a subterranean zone to form a foamed cement composition.

51. The method of claim 50 further comprising the step of introducing a surfactant mixture to the cement composition to stabilize the foamed cement composition.

52. The method of claim 50 wherein the hydraulic cement comprises calcium, aluminum, silicon, oxygen, or sulfur.

53. The method of claim 50 wherein the hydraulic cement comprises a Portland cement.

54. The method of claim 50 wherein the water in the cement composition comprises fresh water or salt water.

55. The method of claim 50 wherein the water is present in the cement composition in an amount in the range of from about 30% to about 100% by weight of the hydraulic cement in the cement composition.

56. The method of claim 50 wherein the gas generating chemical comprises a compound capable of generating a gas in the cement composition that comprises nitrogen, carbon dioxide, or carbon monoxide.

57. The method of claim 50 wherein the oxidizing agent comprises ammonium persulfate, sodium persulfate, potassium persulfate, sodium chlorite, sodium perborate, sodium peroxy carbonate, calcium hypochlorite, sodium hypochlorite, sodium hypobromite, sodium bromite, sodium bromate, or sodium chlorate.

58. The method of claim 50 wherein the oxidizing agent is present in an amount in the range of from about 2% to about 20% by weight of the hydraulic cement in the cement composition.

59. The method of claim 50 wherein the aqueous solution or dispersion further comprises a surfactant mixture.

60. The method of claim 59 wherein the surfactant mixture comprises an ethoxylated alcohol ether sulfate surfactant, an alkyl amidopropylbetaine surfactant, an alkene amidopropylbetaine surfactant, an alkyl amidopropyldimethylamine oxide surfactant, or an alkene amidopropyl dimethylamine oxide surfactant.

61. The method of claim 59 wherein the surfactant mixture is present in the aqueous solution or dispersion in an amount in the range of from about 2% to about 15% by weight of a water component in the aqueous solution or dispersion.

62. The method of claim 50 wherein the aqueous solution or dispersion comprises fresh water or salt water.

63. The method of claim 50 wherein the weight ratio of the oxidizing agent to the gas generating chemical is in the range of from about 15:1 to about 1:1.

64. The method of claim 50 wherein the aqueous solution or dispersion further comprises a hydraulic cement.

65. The method of claim 64 wherein the hydraulic cement is present in an amount in the range of from about 150% to about 300% by weight of a water component in the aqueous solution or dispersion.

66. The method of claim 50 wherein the gas generating chemical comprises hydrazine, a hydrazine salt, azodicarbonamide, azobis(isobutyronitrile), p-toluene sulfonyl hydrazide, p-toluene sulfonyl semicarbazide, carbohydrazide, p-p'-oxybis(benzenesulfonylhydrazide), or a mixture thereof.

67. The method of claim 50 wherein the gas generating chemical is present in the aqueous solution or dispersion in an amount in the range of from about 0% to about 50% by weight of a water component in the aqueous solution or dispersion.

68. The method of claim 50 further comprising the step of introducing a surfactant mixture to the cement composition or the foamed cement composition.

69. A method of reducing gas-locking problems when cementing a subterranean zone comprising the steps of:
   providing a cement composition that comprises a hydraulic cement, water, and an oxidizing agent;
   contacting the cement composition downstream of at least one cement pump with an aqueous solution or dispersion that comprises water and a gas generating chemical;
   allowing the gas generating chemical to react so as to produce gas in the cement composition to produce a foamed cement composition;
   placing the cement composition in a chosen subterranean zone; and
   allowing the foamed cement composition to set in the subterranean zone.

70. The method of claim 69 further comprising contacting the cement composition with a surfactant.

71. A method of generating gas in a cement composition comprising the steps of:
   providing the cement composition comprising a hydraulic cement, water, and at least one gas generating chemical;
   providing an aqueous solution or dispersion that comprises an oxidizing agent; and
   contacting the cement composition downstream of at least one cement pump with the aqueous solution or dispersion so that a gas is generated in the cement composition downstream of at least one cement pump.

72. The method of claim 71 wherein the weight ratio of the oxidizing agent to the gas generating chemical is in the range of from about 15:1 to about 1:1.

73. The method of claim 71 wherein the hydraulic cement comprises a Portland cement, a pozzalana cement, a gypsum cement, an aluminous cement, a silica cement, or a slag cement.

74. The method of claim 71 wherein the hydraulic cement is a Portland cement.

75. The method of claim 71 wherein the water in the cement composition comprises fresh water or salt water.

76. The method of claim 71 wherein the water is present in the cement composition in an amount in the range of from about 30% to about 70% by weight of the hydraulic cement in the cement composition.

77. The method of claim 71 wherein the oxidizing agent in the cement composition comprises ammonium persulfate, sodium persulfate, potassium persulfate, sodium chlorite, sodium chlorate, hydrogen peroxide, sodium perborate, sodium peroxy carbonate, calcium hypochlorite, sodium hypochlorite, sodium hypobromite, sodium bromite, sodium bromate, sodium chlorate, and/or a mixture thereof.

78. The method of claim 71 wherein the oxidizing agent in the cement composition comprises sodium chlorite.

79. The method of claim 71 wherein the oxidizing agent is present in the cement composition in an amount in the range of from about 5% to about 25% by weight of the hydraulic cement in the cement composition.

80. The method of claim 71 wherein the aqueous solution or dispersion comprises a water component that comprises fresh water or salt water.

81. The method of claim 71 wherein the gas generating chemical in the aqueous solution or dispersion comprises a hydrazine group, a hydrazine salt, azodicarbonamide, azobis(isobutyronitrile), p-toluene sulfonyl hydrazide, p-toluene sulfonyl semicarbazide, carbohydrazide, p-p'-oxybis(benzenesulfonylhydrazide), and/or a mixture thereof.

82. The method of claim 71 wherein the gas generating chemical in the aqueous solution or dispersion comprises carbohydrazide.

83. The method of claim 71 wherein the gas generating chemical is present in the aqueous solution or dispersion in an amount in the range of from about 10% to about 50% by weight of a water component in the aqueous solution or dispersion.

84. The method of claim 71 wherein the aqueous solution or dispersion further comprises a surfactant.

85. The method of claim 84 wherein the surfactant is present in the aqueous solution or dispersion in an amount in the range of from about 2% to about 15% by weight of a water component in the aqueous solution or dispersion.

* * * * *